(12) United States Patent
Chen et al.

(10) Patent No.: US 8,260,799 B2
(45) Date of Patent: Sep. 4, 2012

(54) METHOD AND APPARATUS FOR CREATING PATTERN MATCHING STATE MACHINE AND IDENTIFYING PATTERN

(75) Inventors: Jian Chen, Shenzhen (CN); Hong Zhou, Shenzhen (CN); Xinyu Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 94 days.

(21) Appl. No.: 12/892,728

(22) Filed: Sep. 28, 2010

(65) Prior Publication Data

US 2011/0016142 A1    Jan. 20, 2011

Related U.S. Application Data

(63) Continuation of application No. PCT/CN2009/071082, filed on Mar. 30, 2009.

(30) Foreign Application Priority Data

Mar. 31, 2008  (CN) .......................... 2008 1 0103063

(51) Int. Cl.
   *G06F 17/30* (2006.01)
(52) U.S. Cl. ......... 707/758; 707/716; 707/803; 709/203
(58) Field of Classification Search .................. 707/749, 707/750, 758, 716, 803; 709/201, 202, 203; 726/13
See application file for complete search history.

(56) References Cited

U.S. PATENT DOCUMENTS

| | | | | |
|---|---|---|---|---|
| 5,995,963 A | * | 11/1999 | Nanba et al. ................... | 707/750 |
| 6,134,580 A | * | 10/2000 | Tahara et al. .................. | 709/202 |
| 6,185,601 B1 | * | 2/2001 | Wolff ........................... | 709/203 |
| 6,782,403 B1 | * | 8/2004 | Kino et al. ..................... | 707/803 |
| 7,069,291 B2 | * | 6/2006 | Graves et al. .................. | 709/201 |
| 7,508,985 B2 | * | 3/2009 | Van Lunteren ............... | 382/181 |
| 2004/0068494 A1 | * | 4/2004 | Tozawa et al. ................. | 707/716 |
| 2007/0055766 A1 | * | 3/2007 | Petropoulakis et al. ...... | 709/224 |
| 2007/0075878 A1 | | 4/2007 | Furodet et al. | |
| 2007/0104375 A1 | | 5/2007 | Furodet et al. | |
| 2007/0192286 A1 | | 8/2007 | Norton et al. | |
| 2007/0233628 A1 | | 10/2007 | Sherwood et al. | |
| 2007/0282835 A1 | * | 12/2007 | Duxbury ....................... | 707/749 |

(Continued)

FOREIGN PATENT DOCUMENTS

EP  0 918 267 A2  5/1999

(Continued)

OTHER PUBLICATIONS

International Search Report dated Jul. 9, 2009 in connection with International Patent Application No. PCT/CN2009/071082.

(Continued)

*Primary Examiner* — Shahid Alam

(57) ABSTRACT

The present invention discloses a method and an apparatus for creating a pattern matching state machine and identifying a pattern, and relates to pattern matching technologies. The method includes: obtaining a sub-keyword field after division; generating a state transition (goto) function according to the sub-keyword field; generating a failure function of each state node according to the goto function; generating a next-hop goto function δ of each state node according to the goto function and the failure function; in the process of converting the failure chain, the entry with a failure transition to the initial state is not generated. Therefore, the storage content does not increase massively, the storage structure of the AC algorithm is optimized, and the processing speed of the AC algorithm is improved.

20 Claims, 13 Drawing Sheets

U.S. PATENT DOCUMENTS

2008/0046423 A1* 2/2008 Khan Alicherry et al. ... 707/750

FOREIGN PATENT DOCUMENTS

GB 2 437 560 A 10/2007

OTHER PUBLICATIONS

Sarang Dharmapurikar, et al., "Fast and Scalable Pattern Matching for Content Filtering", ANCS'05, Oct. 28, 2005, p. 183-192.

Alfred V. Aho, et al., "Efficient String Matching: An Aid to Bibliographic Search, Communications of the ACM", Jun. 1975, vol. 18, No. 6, p. 333-340.

Wei-Nan Li, et al., "Multi-Pattern Matching Algorithms and Hardware Based Implementation", Journal of Software, vol. 17, No. 12, Dec. 2006, p. 2403-2415.

Fang Xianjia, et al., "Research on Optimizing Multi-Pattern Matching Algorithm", 2007, China Academic Journal Electronic Publishing House, p. 211-213.

Written Opinion of the International Searching Authority dated Jul. 9, 2009 in connection with International Patent Application No. PCT/CN2009/071082.

* cited by examiner (A) Goto function.

| $i$ | 1 | 2 | 3 | 4 | 5 | 6 | 7 | 8 | 9 |
|---|---|---|---|---|---|---|---|---|---|
| $f(i)$ | 0 | 0 | 0 | 1 | 2 | 0 | 3 | 0 | 3 |

(B) Failure function.

| $i$ | $output(i)$ |
|---|---|
| 2 | {he} |
| 5 | {she, he} |
| 7 | {his} |
| 9 | {hers} |

(C) Output function.

--Prior Art--

--Prior Art--

--Prior Art--

| <state, substring> | Next state | Matching strings | Failure chain |
|---|---|---|---|
| <q0, tech> | q1 | NULL | q0 |
| <q0, tele> | q2 | s3 | q0 |
| <q0, phon> | q3 | NULL | q0 |
| <q0, elep> | q4 | NULL | q0 |
| <q1, nica> | q5 | NULL | q0 |
| <q2, phon> | q6 | NULL | q3, q0 |
| <q4, hant> | q7 | s6 | q0 |
| <q0, tel> | NULL | s3 | NULL |
| <q3, e> | NULL | s5 | NULL |
| <q5, l> | NULL | s1 | NULL |
| <q5, ly> | NULL | s2, s1 | NULL |
| <q6, e> | NULL | s4, s5 | NULL |

--Prior Art--

FIG. 3

|  |  | Input symbol | | Next state |
|---|---|---|---|---|
|  |  | State 0: | h | 1 |
|  |  |  | s | 3 |
|  |  |  | . | 0 |
|  |  | State 1: | e | 2 |
|  |  |  | i | 6 |
|  |  |  | h | 1 |
|  |  |  | s | 3 |
|  |  |  | . | 0 |
| State 9: | State 7: | State 3: | h | 4 |
|  |  |  | s | 3 |
|  |  |  | . | 0 |
|  | State 5: | State 2: | r | 8 |
|  |  |  | h | 1 |
|  |  |  | s | 3 |
|  |  |  | . | 0 |
|  |  | State 6: | s | 7 |
|  |  |  | h | 1 |
|  |  |  | . | 0 |
|  |  | State 4: | e | 5 |
|  |  |  | i | 6 |
|  |  |  | h | 1 |
|  |  |  | s | 3 |
|  |  |  | . | 0 |
|  |  | State 8: | s | 9 |
|  |  |  | h | 1 |
|  |  |  | . | 0 |

--Prior Art--

FIG. 4

| <state, substring> | Next state | Matching strings |
|---|---|---|
| <q0, tech> | q1 | NULL |
| <q0, tele> | q2 | s3 |
| <q0, phon> | q3 | NULL |
| <q0, elep> | q4 | NULL |
| <q1, nica> | q5 | NULL |
| <q2, phon> | q6 | NULL |
| *<q6, e>* | *NULL* | *s5* |
| <q4, hant> | q7 | s6 |
| <q0, tel> | NULL | s3 |
| <q3, e> | NULL | s5 |
| <q5, l> | NULL | s1 |
| <q5, ly> | NULL | s2, s1 |
| <q6, e> | NULL | s4, s5 |

FIG. 6

| <state, substring> | Next state | Matching strings | Failure chain |
|---|---|---|---|
| <q0, mnop> | q41 | NULL | q0 |
| <q0, ijkl> | q31 | NULL | q0 |
| <q0, efgh> | q21 | NULL | q0 |
| <q0, abcd> | q11 | NULL | q0 |
| <q41, hook > | NULL | q42 , namely, s1 | q0 |
| <q31, mnop > | q32 | NULL | q41, q0 |
| <q21, ijkl > | q22 | NULL | q31, q0 |
| <q11, efgh> | q12 | NULL | q21, q0 |
| <q32, rest> | NULL | q33 , namely, s2 | q0 |
| <q22, mnop > | q23 | NULL | q32, q41, q0 |
| <q12, ijkl > | q13 | NULL | q22, q31, q0 |
| <q14, qrst> | NULL | q15 , namely, S4 | q0 |
| <q23, sina> | NULL | q24 , namely, S3 | q0 |
| <q13, mnop > | q14 | NULL | q23, q32, q41, q0 |

FIG. 8

| <state, substring> | Next state | Matching strings |
|---|---|---|
| <q0, mnop> | q41 | NULL |
| <q0, ijkl> | q31 | NULL |
| <q0, efgh> | q21 | NULL |
| <q0, abcd> | q11 | NULL |
| <q41, hook > | NULL | q42 |
| <q31, mnop > | q32 | NULL |
| <q21, ijkl > | q22 | NULL |
| <q11, efgh> | q12 | NULL |
| <q32, rest> | NULL | q33 |
| *<q32, hook>* | *NULL* | *q42* |
| <q22, mnop > | q23 | NULL |
| <q12, ijkl > | q13 | NULL |
| <q14, qrst> | NULL | q15 |
| *<q14, sina>* | *NULL* | *q24* |
| *<q14, rest>* | *NULL* | *q33* |
| *<q14, hook>* | *NULL* | *q42* |
| <q23, sina> | NULL | q24 |
| *<q23, rest>* | *NULL* | *q33* |
| *<q23, hook>* | *NULL* | *q42* |
| <q13, mnop > | q14 | NULL |

METHOD AND APPARATUS FOR CREATING PATTERN MATCHING STATE MACHINE AND IDENTIFYING PATTERN

CROSS-REFERENCE TO RELATED APPLICATIONS

This application is a continuation of International Application No. PCT/CN2009/071082, filed on Mar. 30, 2009, which claims priority to Chinese Patent Application No. 200810103063.4, filed on Mar. 31, 2008, both of which are hereby incorporated by reference in their entireties.

TECHNICAL FIELD

The present invention relates to pattern matching technologies, and in particular, to a method and an apparatus for creating a pattern matching state machine and identifying a pattern.

BACKGROUND

Pattern matching generally refers to searching for predefined keywords in text data. Pattern matching is a basic topic in computer science. The research on pattern matching is important in multitudinous fields such as information retrieval and pattern identification, and is significant in the applications such as spelling check, language translation, data compression, search engine, intrusion detection, content filtering, computer virus characteristic code matching, and gene sequence comparison. For example, in the applications such as information obtaining and text editing, a user specifies some keywords, and the locations of the keywords need to be found in the text quickly.

The prior art provides an Aho-Corasick (AC) algorithm. The algorithm is simple and efficient, and can find all locations of a finite number of keywords in any text. The principles of the algorithm are to define a finite state machine according to a series of keywords, and then use the text as an input of the finite state machine. As long as a matched keyword is found, the algorithm reports success of matching the keyword. Depending on the number of bytes input at a time, the AC algorithm is categorized into: original AC algorithm (1 byte is input at a time), and multi-byte AC algorithm.

FIG. 1 shows a function constructed through the original AC algorithm in the prior art. Supposing the user specifies these keywords {he, she, his, hers}, the user expects to find any of such keywords in the text, and the algorithm outputs the search result and notifies it to the user. The process of performing pattern matching through the original AC algorithm is: Generating a state transition (goto) function (as shown in FIG. 1A), a failure function (as shown in FIG. 1B), and an output function (as shown in FIG. 1C) according to the keyword set {he, she, his, hers}. This process includes two steps: The first step is to determine the state and the goto function (represented by g), and the second step is to calculate the failure function (represented by f). The construction of the output function begins in the first step, and ends in the second step. Supposing the user inputs "sshe" for searching, when the user inputs "s", g(0, s) is equal to 3, and therefore, the state is transitioned to 3; when the user inputs the second s, the goto function fails, and g(3, s) is equal to "fail", and therefore, the failure function is invoked. f(3)=0 indicates a transition to state 0. Afterward, g(0, s) is equal to 3, and therefore, the current state is still state 3. When the user inputs "h", g (3, h) is equal to 4, and the state is transitioned to 4. When the user inputs "e", g(4, e) is equal to 5, and the state is transitioned to 5. Because Output(5)={she, he}, this search process finds two keywords predefined by the user: {she, he}.

In the original AC algorithm, the user inputs 1 byte at a time. To improve efficiency of the algorithm, the prior art provides an improved AC algorithm (namely, the multi-byte AC algorithm). The basic conception of the improved algorithm is as follows: n bytes are input at a time and detected. Because the location of the defined n-byte characteristic string in the data to be detected may be not on the integral multiple of n starting from the start position of the input data, the offset may be 0 to n−1 characters randomly. To avoid detection omission, it is necessary to detect all offset positions, that is, n state machines may be used concurrently to perform detection.

FIG. 2 shows a function constructed through a multi-byte AC algorithm in the prior art. Supposing the keyword combination specified by the user is {S1: technical; S2: technically; S3: tel.; S4: telephone; S5: phone; S6: elephant}, the detection step length n is 4 bytes. FIG. 2A shows a goto function constructed. Starting from state q0, the state is transitioned to q1 after "tech" is input, transitioned to q2 after "tele" is input, transitioned to q3 after "phon" is input, and transitioned to q4 after "elep" is input, and so on. Because the matched pattern is not necessarily an integral multiple of 4 bytes, short fields need to be added. In the failure function shown in FIG. 2B, short fields are added.

With the multi-byte AC algorithm, the step length of each transition is n bytes. In the original AC algorithm, the transition of n bytes involves n attempts of memory access; in the improved AC algorithm, the transition of n bytes involves only one attempt of memory access, and the access speed is 4 times of that of the original AC algorithm.

However, for both the original AC algorithm and the multi-byte AC algorithm, due to existence of the failure function, when the goto function fails, the AC pattern matching state machine needs to access the memory for at least one more time to read the failure function, which thus reduces the efficiency of the AC algorithm.

Moreover, for the multi-byte AC algorithm, the index of the state transition table includes not only the input state, but also the input strings. Therefore, each entry needs to store the complete failure chain. Otherwise, once the matching fails, the after-failure state is missing. FIG. 3 shows the state transition table of the multi-byte AC algorithm provided in FIG. 2. For the <q2, phon> entry in FIG. 3, if merely the first failed q3 state is stored, when the input string is still failed in the q3 state, it is necessary to search for the failure output state under the q3 input state. However, the failure output state of q3 is stored in the <q0, phon> entry, namely, the parent state of q3. Because it is impossible to deduce the previous q0 state of q3 according to q3 simply, it is impossible to search this table for a new failure function. Therefore, the work cannot go on.

Moreover, because the failure chain has a variable length and cannot be stored in an entry, another failure chain table needs to be created for storing the complete failure chain. Through a mechanism such as a pointer function, the failure in the original table is pointed to an address of a newly created complete failure chain table. Such processing methods are complicated and capricious, and require extra storage space and extra processing steps.

In conclusion, to improve efficiency of the AC algorithm, the prior art provides a method of eliminating a failure function for an original AC algorithm. In this method, a δ function is introduced in place of the goto function "g", namely, a new goto function δ is obtained as a combination of all goto functions and failure functions. The creation of the introduced function is based on the goto functions and failure functions. After the δ function is created, the pattern matching state machine of the AC algorithm is composed of a finite state set "S" and the next-hop goto function δ. For each input character "a" under state "r", the δ(s,a) function has an output state "s" that belongs to the finite state set "S", that is, a definite output state exists for every input character. In this way, no failure function actually exists. In pattern matching, it is only necessary to execute state←δ(state,$a_i$) simply. The process of generating the δ function includes the following steps:

1. Create a new null state set "S".
2. For the initial state 0, use the state generated by every input goto function as the output state of the δ function, namely, δ(0, a)=g(0, a) If the output state r is not 0, add this state "r" to the null state set: S←S∪r.
3. Retrieve every new state "s" from the state set, and delete the state s from the state set S. For every input character "a" under the state s, perform the following step:
    (1) If the output of the goto function g(s,a) is not "fail", set the output state as the output of the δ function under this state, for example, δ(s,a)=g(s,a); or
    (2) If the output of the goto function g(s,a) is "fail", use the output state of the failure function of this output state as a new input state, execute the goto function δ, and use its output state as the output state of the goto function, namely, δ(s,a)=δ(f(s), a).
4. The foregoing process goes on until the state in the state set "S" is null.

FIG. 4 shows a state transition of eliminating failure after the δ function is applied. Taking state 8 as an example, FIG. 1 includes only a goto function that makes a goto transition to state 9, and a failure function that makes a failure transition to state 0. Now, after the combination, the failure function that makes a failure transition to state 0 changes to a new δ function that makes a transition to state 1 when h is input, where the input "." indicates any character other than s and h. With such a δ function, it is not necessary to consider whether the function is a failure function or a goto function, and a definite step of a transition can be performed according to the δ function, and this improves the efficiency of the original AC algorithm.

However, in practical implementation, to ensure the operation efficiency, the target state of a transition for every state is a one-dimensional array composed of 256 units. The inputs of n bytes are n×256 possibilities, but the number of valid inputs is no more than 5. Such a storage mode leads to a resource waste.

SUMMARY

To overcome complexity and inefficiency of storage and processing of the failure function in the AC algorithm and improve the processing speed of the AC algorithm, embodiments of the present invention provide a method and an apparatus for creating a pattern matching state machine and identifying a pattern. The technical solution under the present invention is as follows:

A method for creating a pattern matching state machine includes:
    dividing a keyword in a predefined keyword set according to a preset rule, and obtaining a sub-keyword field as a result of the division;
    generating a goto function according to the sub-keyword field, and generating a failure function of each state node according to the goto function; and
    generating a next-hop goto function δ of each state node according to the goto function and the failure function.

A method for identifying a pattern includes:
    dividing a keyword in a predefined keyword set according to a preset rule, and obtaining a sub-keyword field as a result of the division;
    generating a goto function according to the sub-keyword field, and generating a failure function of each state node according to the goto function;
    generating a next-hop goto function δ of each state node according to the goto function and the failure function; and
    matching the sub-keyword field with patterns according to the δ function; if an entry of the δ function indexed by the state node and the sub-keyword field is not available under other than an initial state node q0, setting the initial state node q0 to an input state of the δ function of the input state node, and executing the δ function according to the new input state and the sub-keyword field; if the sub-keyword field matches no pattern on the initial state node q0, setting q0 to an output state.

An apparatus for creating a pattern matching state machine includes:
    an obtaining module, configured to: divide a keyword in a predefined keyword set according to a preset rule, and obtain a sub-keyword field as a result of the division;
    a goto function generating module, configured to generate a goto function according to the sub-keyword field obtained by the obtaining module;
    a failure function generating module, configured to generate a failure function of each state node according to the goto function generated by the goto function generating module;
    a δ function generating module, configured to generate a next-hop goto function δ of each state node according to the goto function generated by the goto function generating module and the failure function generated by the failure function generating module.

The technical solution under the present invention brings the following benefits:

The existing failure chain in a multi-byte AC algorithm is eliminated, and the AC algorithm together with the existing goto function is converted into a uniform goto function δ; in the process of converting the failure chain, the entry with a failure transition to the initial state is not generated. Therefore, the storage content does not increase massively, the storage space is saved, the storage structure of the AC algorithm is optimized, the processing steps of the AC algorithm are simplified and solidified, and the processing speed of the AC algorithm is improved.

BRIEF DESCRIPTION OF THE DRAWINGS

FIG. 3 shows a state transition table of a multi-byte AC algorithm in the prior art;

FIG. 4 shows a state transition of eliminating failure after a δ function is applied in an original AC algorithm in the prior art;

FIG. 6 shows a state transition table of a multi-byte AC algorithm after failure is eliminated provided in the first embodiment of the present invention;

FIG. 8 shows a state transition table of a multi-byte AC algorithm provided in the first embodiment of the present invention and not based on the technical solution under the present invention;

FIG. 10 shows a state transition table that uses the technical solution under the present invention to eliminate the failure chain provided in the first embodiment of the present invention relative to FIG. 8;

DETAILED DESCRIPTION

Figure 1:
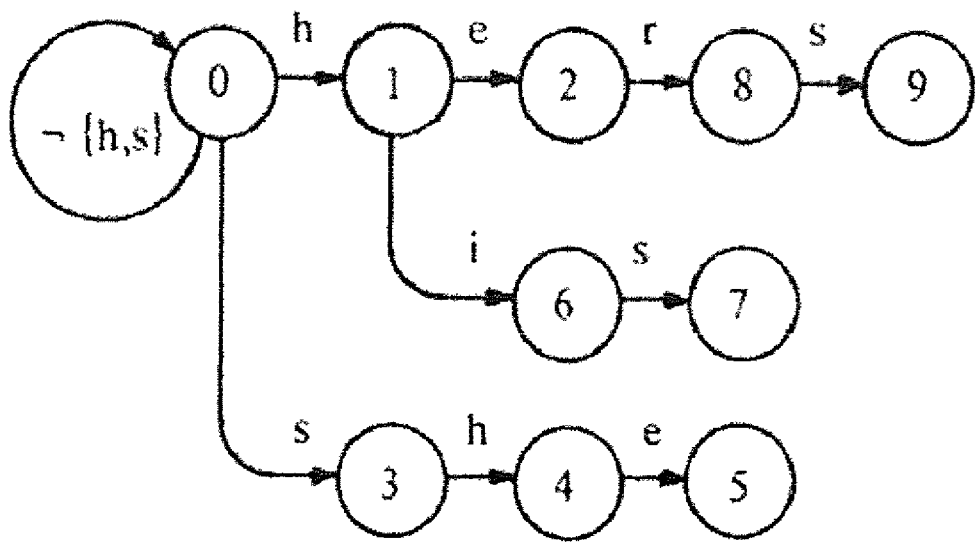
FIG. 1 shows a function constructed through an original AC algorithm in the prior art.
Figure 2A:
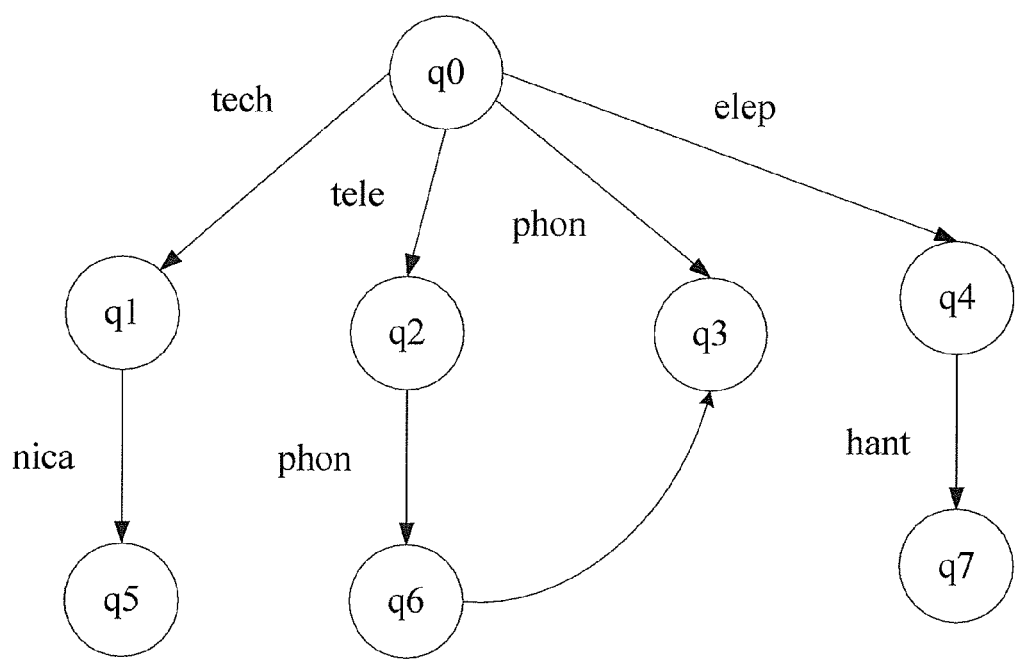
FIG. 2 shows a function constructed through a multi-byte AC algorithm in the prior art.
Figure 2B:
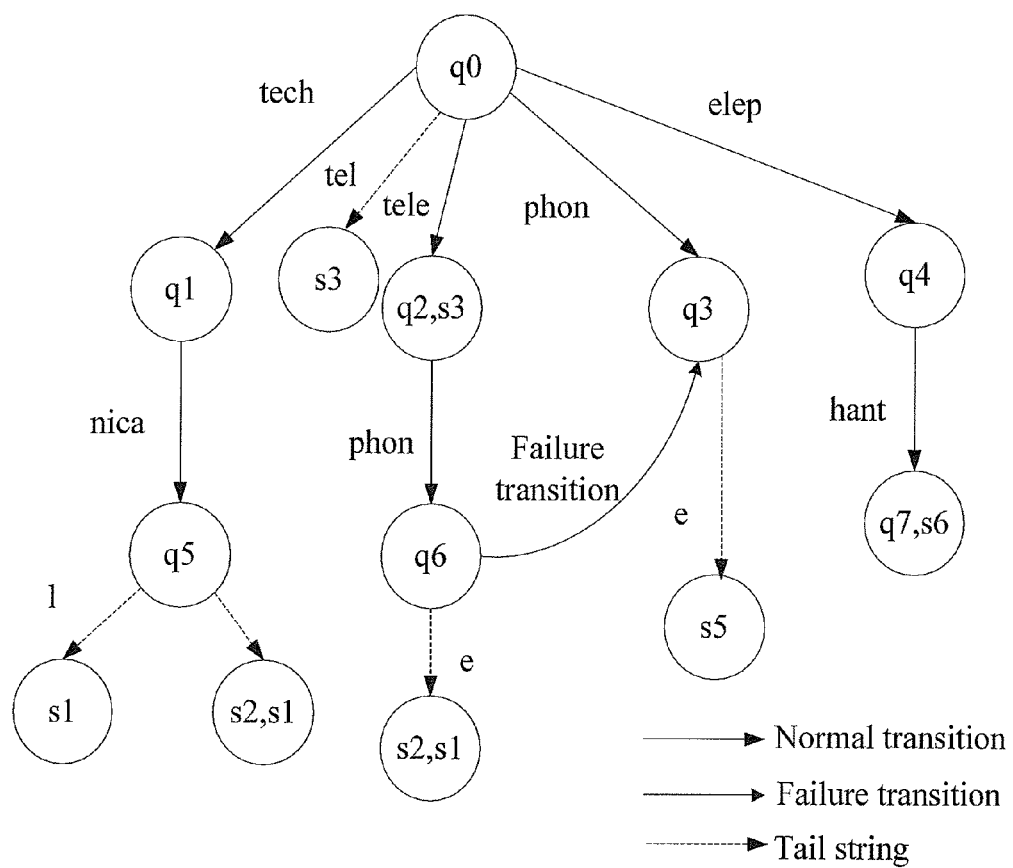

To make the technical solution, objectives and merits of the present invention clearer, the following describes the embodiments of the present invention in more detail with reference to the accompanying drawings.

A method for creating a pattern matching state machine provided in an embodiment of the present invention includes:

dividing a keyword in a predefined keyword set according to a preset rule, and obtaining a sub-keyword field as a result of the division;

generating a goto function according to the sub-keyword field;

generating a failure function of each state node according to the goto function; and generating a next-hop goto function $\delta$ of each state node according to the goto function and the failure function.

At the time of obtaining the sub-keyword field, a keyword in the predefined keyword set is divided at intervals of preset bytes to obtain a sub-keyword field. At the time of dividing the keyword, the characters shorter than the preset byte length constitute a sub-keyword field.

The process of generating the next-hop goto function $\delta$ of each state node according to the goto function and the failure function includes:

obtaining each state node in the state queue S consecutively; after obtaining each state node, deleting the obtained state node in the state queue S, and generating an output of the next-hop goto function $\delta$ corresponding to the state node according to the obtained state node and the sub-keyword field.

The detailed process includes:

creating a state queue S, where the state queue is null by default;

judging whether the output state node of the goto function corresponding to the sub-keyword field exists according to the goto function and the sub-keyword field of q0, where the judging begins with q0; if the output state node exists, setting the output state node of the goto function corresponding to the sub-keyword field to be the output state node of the $\delta$ function corresponding to the sub-keyword field; and adding the non-q0 output state nodes to the state queue S consecutively; and obtaining each state node in the state queue S consecutively according to a First In First Out (FIFO) rule; after obtaining a state node, deleting the obtained state node in the state queue, generating an output of the $\delta$ function corresponding to the state node according to the obtained state node and the sub-keyword field, and adding the non-null output state nodes to the state queue S consecutively; and repeating the foregoing process until the state queue is null.

The process of generating the $\delta$ function corresponding to the state node according to the obtained state node and the sub-keyword field includes:

using the sub-keyword field as an input of the state node, and judging whether the output state node of the goto function corresponding to the state node exists;

if the output state node of the goto function corresponding to the state node does not exist, judging whether the output of the failure function of the state node is an initial state node q0; if yes, ending the process without creating any output entry of the $\delta$ function of the state node; if not, obtaining the output of the $\delta$ function of the state node according to the output state node and the sub-keyword field of the failure function of the state node; and if the output state node of the goto function exists, setting the output state node of the goto function as an output of the $\delta$ function of the state node, and adding the output state node of the $\delta$ function to the state queue.

The process of obtaining the output of the $\delta$ function of the state node according to the output state node and the sub-keyword field of the failure function of the output state node includes:

using the output state node and the sub-keyword field of the failure function of the state node as an input of the $\delta$ function, obtaining the output of the $\delta$ function, and generating the output of the $\delta$ function of the output state node of the failure function; or, if the output of the $\delta$ function does not exist, ending the process without creating the $\delta$ function output entry of the state node.

An additional step is: matching the sub-keyword field with patterns according to the $\delta$ function when the patterns are identified through the pattern matching state machine created above; if the entry of the $\delta$ function indexed by the state node and the sub-keyword field is not available under other than the initial state node q0, setting the initial state node q0 to an input state of the $\delta$ function of the input state node, and executing the $\delta$ function according to the new input state and the sub-keyword field; if the sub-keyword field matches no pattern on the initial state node q0, setting q0 to an output state.

Through the technical solution provided herein, the storage content does not increase massively, the storage space is saved, the storage structure of the AC algorithm is optimized, the processing steps of the AC algorithm are simplified and solidified, and the processing speed of the AC algorithm is improved. More details are given in the following embodiments.

Embodiment 1

Figure 5:
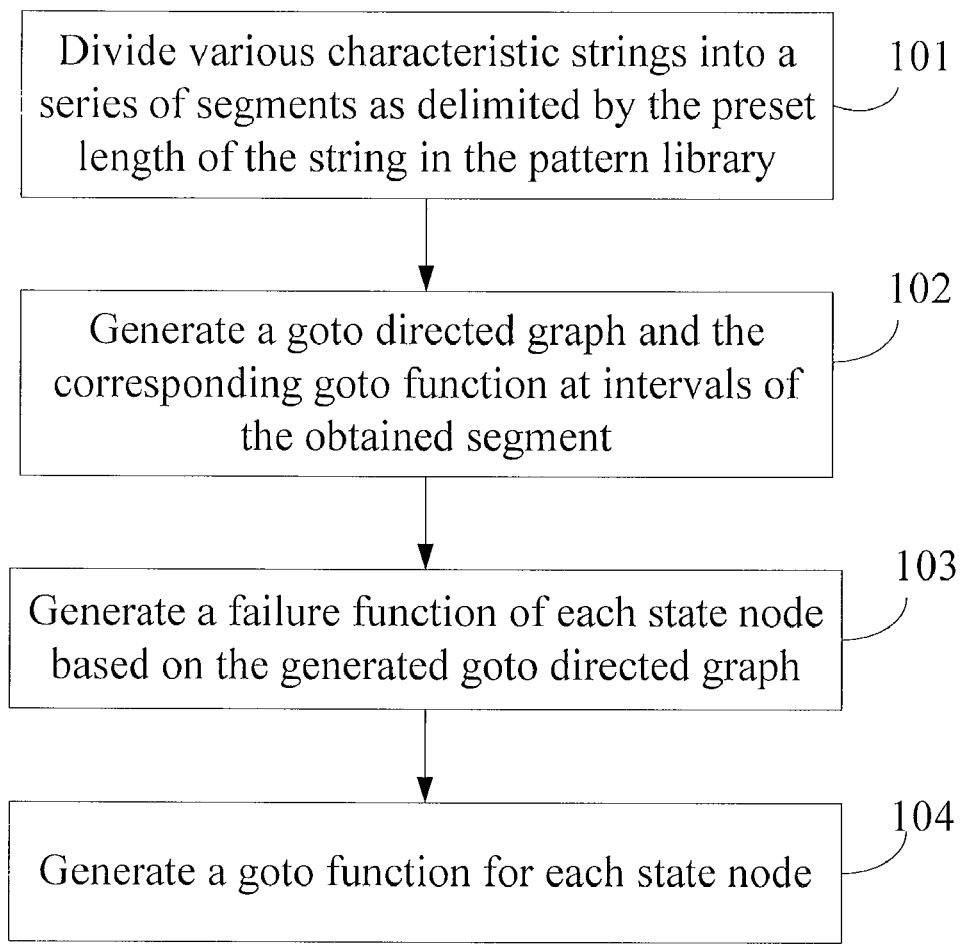
FIG. 5 is a flowchart of a method for creating a pattern matching state machine provided in a first embodiment of the present invention.

As shown in FIG. 5, a method for creating a pattern matching state machine is provided in this embodiment. This method simplifies the processing of the $\delta$ function after the failure chain is eliminated, and avoids massive storage of branches that make failure transitions to the initial state q0. The detailed steps are as follows:

101. Divide various characteristic strings into a series of segments as delimited by the preset length of the string in the pattern library.

At the time of dividing the characteristic strings in the pattern library as delimited by the preset length, the preset length may be n preset bytes. If the characters are shorter than n bytes, the characters also form an independent segment.

It is assumed that the characteristic strings are the keyword fields {technical, technically, tel, telephone, phone, elephant} and that the preset length is 4 bytes. Segments like {tech nica l, tech nica lly, tel, tele phon e, phon e} are formed, where "tech", "nica", and "l" are known as sub-keyword fields or substring fields.

102. Generate a goto directed graph and the corresponding goto function at intervals of the obtained segment.

At the time of generating the goto directed graph and the corresponding goto function, any method for generating a goto function in the prior art is applicable.

103. Generate a failure function of each state node based on the generated goto directed graph.

104. Generate a goto function δ for each state node, as detailed below:

104A. Create a null state queue S.

104B. For the initial state q0, use the state generated by every input goto function as the output state of the δ function, namely, δ(0,a)←g(0,a). If the output state r is not 0, add this state "r" is added to the null state queue S: S←S∪r. The "a" in this embodiment is used to indicate each sub-keyword field such as "tech" and "nica".

104C. Retrieve every new state "s" from the state queue, and delete the state s from the state queue S. For every input character "a" under the state s, execute the following steps:

201. Judge whether the output of the goto function g(s,a) is "fail"; if yes, perform step 202; if not, perform step 205.

202. Judge whether the output of the failure function under this state is the initiate state q0; if yes, perform step 203; if not, perform step 204.

203. Terminate the state processing without creating the goto function entry of this node.

204. Use the output state of the failure function under this state as a new input state. Execute the goto function δ, and use the output state of the goto function as the output state of the goto function: δ(s,a)←δ(f(s),a).

205. Set the output state as the output of the δ function under this state, for example, δ(s,a)←g(s,a); and add the out put state node to the state queue S.

Repeat the foregoing steps until the state of the state queue S is null.

For each input string under state "r", the δ(s,a) function has an output state "s" that belongs to the finite state queue "S", namely, a definite output state exists for every input character. In this way, actually no failure function exists. In pattern matching, it is only necessary to execute state←δ(state,a_i) simply.

At the time of executing state←δ(state,a_i), if no entry indexed by "input state+input string" is found in the state transition table, q0 is set to the next state directly. That is, the output of the default final failure processing function under every input state is q0.

Detailed above is a process of creating a pattern matching state machine. In FIG. 6, it is still assumed that the keyword fields are {technical, technically, tel, telephone, phone, elephant}. The state transition table of the multi-byte AC algorithm after failure is eliminated is obtained by means of the method for creating a pattern matching state machine herein. Compared with FIG. 3, the state transition table in FIG. 6 has the following additional row:

| <q6, e> | NULL | s5 |
|---|---|---|

The following further describes the benefits brought by the method for creating a pattern matching state machine herein.

Figure 7:
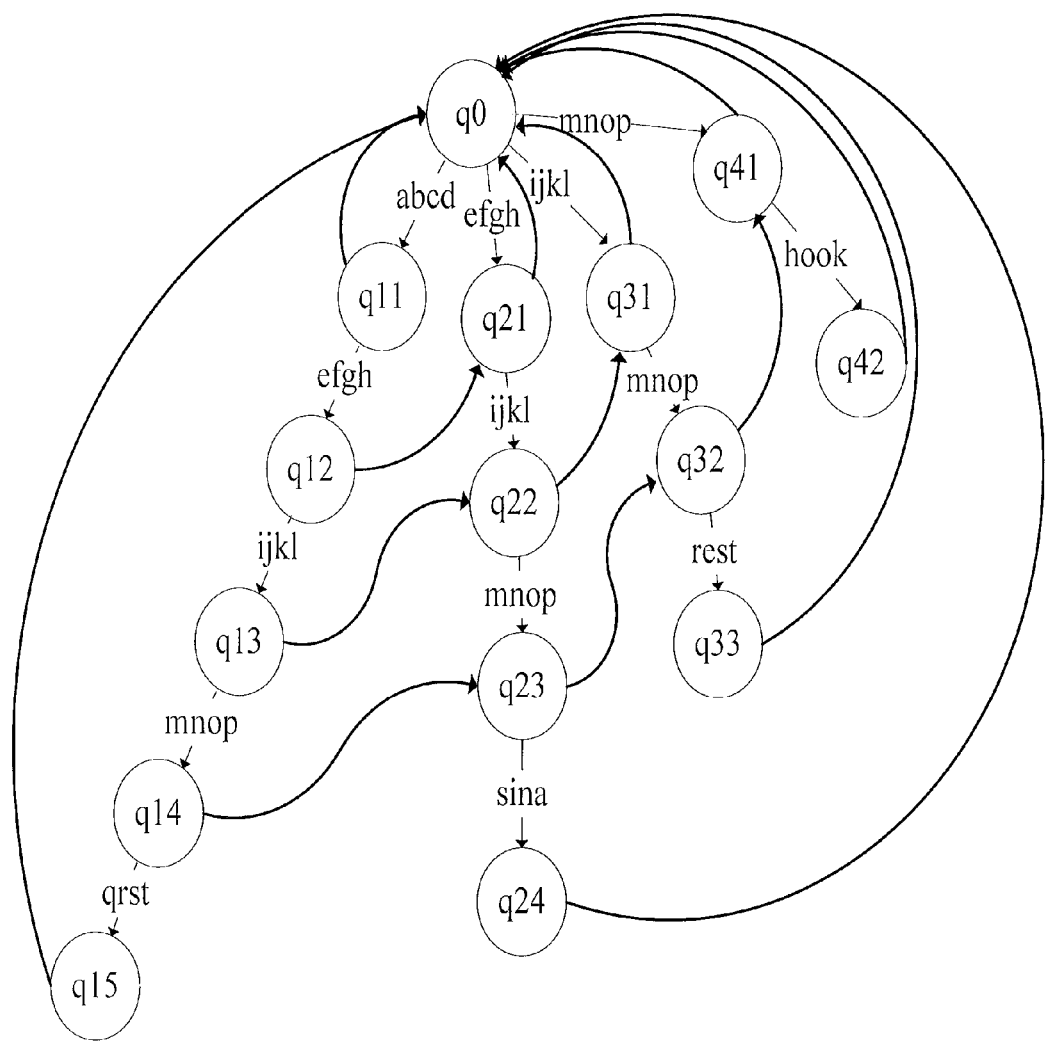
FIG. 7 is a directed schematic diagram of a multi-byte AC algorithm provided in the first embodiment of the present invention and not based on the technical solution under the present invention.

It is assumed that the fields are {s1:mnop hook, s2: ijlk mnop rest, s3: efgh ijlk mnop sina, s4: abcd efgh ijlk mnop qrst}, where the defined step length is 4 bytes. FIG. 7 is a directed schematic diagram of a multi-byte AC algorithm not based on the technical solution under the present invention. In FIG. 7, the thin straight line represents a goto function, and the string on it represents an input string; the thick curve represents a failure function. Obviously, many duplicate failure chains exist. Accordingly, FIG. 8 shows a state transition table of a multi-byte AC algorithm not based on the technical solution under the present invention. The storage structure in FIG. 8 leads to a 43% variable-length failure chain, which affects the processing efficiency drastically.

Taking FIG. 7 as an example, the following gives a detailed process of eliminating the redundant failure chains after applying the method provided herein:

Firstly, create a state queue S, where the state queue is a null queue by default.

Afterward, generate states other than q0: q41, q31, q21, and q11 according to the goto function and the string, and add the generated q41, q31, q21, and q11 to the state queue S.

Next, obtain the elements in the state queue S consecutively on an FIFO basis, namely, obtain the state nodes in the state queue S consecutively, and delete each state node from the state queue S when the state node is obtained. For example:

Obtain q41, and delete q41 in S; according to the goto function and the string, determine G(q41, hook)=q42, namely, corresponding to state q41, when the input sub-keyword field is "hook", if the output state node exists, set δ(g41, hook)=G(q41, hook)=q42; for the newly generated state node q42, match the keyword "S1:mnop hook" successfully; corresponding to state q41, when another sub-keyword field is input, because F(q41)=q0, generate no output entry of the δ function, and terminate the process.

Obtain q31 and delete q31 in S; determine that G(q31, mnop)=q32 according to the goto function and the field string, and therefore, set δ(q31, mnop)=G(q31, mnop)=q32, and add q32 to the state queue S; corresponding to state q31, when another sub-keyword field is input, because F(q31)=q0, generate no output entry of the δ function, and terminate the process.

Likewise, obtain q21 and delete q21 in S; generate δ(q21, ijkl)=G(q21, ijkl)=q22, and add q22 to the state queue S; corresponding to state q21, when another sub-keyword field is input, because F(q21)=q0, generate no output entry of the δ function, and terminate the process.

Likewise, obtain q11 and delete q11 in S; generate δ(q11, efgh)=G(q11, efgh)=q12, and add q12 to the state queue S; corresponding to state q11, when another sub-keyword field is input, because F(q11)=q0, generate no output entry of the δ function, and terminate the process.

Obtain q32 and delete q32 in S; generate δ(q32, rest)=G(q32, rest)=q33; when the output state is q33, match the keyword "S2: ijkl mnop rest" successfully; because F(q31)=q41 and δ(q41, hook)=q42, δ(q32, hook)=q42, and match the keyword "S1:mnop hook" successfully.

Obtain q22 and delete q22 in S; generate δ(q22, mnop)=G(q22, mnop)=q23, and add q23 to the state queue S.

Obtain q12 and delete q12 in S; generate δ(q12, ijkl)=G(q12, ijkl)=q13, and add q13 to the state queue S.

Obtain q23 and delete q23 in S; generate δ(q23, sina)=G(q23, sina)=q24; match the keyword "s3: efgh ijlk mnop sina; F(q23)=q32" successfully, so δ(q23, rest)=δ(q32, rest)=q33; match the keyword "s2: ijkl mnop rest" successfully; because F(q32)=q41, δ(q23, hook)=δ(q41, hook)=q42, and match the keyword "S1:mnop hook" successfully.

Obtain q13 and delete q13 in S; generate δ(q13, mnop)=G(q13, mnop)=q14, and add q14 to the state queue S.

Obtain q14 and delete q14 in queue S; generate δ(q14, qrst)=G(q14, qrst)=q15, and match the keyword "s4:abcd efgh ijlk mnop qrst" successfully; because F(q14)=q23, δ(q14, sina)=δ(f(q14), sina)=δ(q23, sina)=q24; and match the keyword "s3: efgh ijlk mnop sina" successfully.

Because F(q23)=q32, δ(q14, rest)=δ(f(q14), rest)=δ(f(q23), rest)=δ(q32, rest)=q33, and match the keyword "s2:: ijkl mnop rest" successfully; because F(q32)=q41, δ(q14, hook)=δ(f(q14), hook)=δ(f(q23), hook)=δ(f(q32), hook)=δ(q41, hook)=q42, and match the keyword "S1:mnop hook" successfully.

Figure 9:
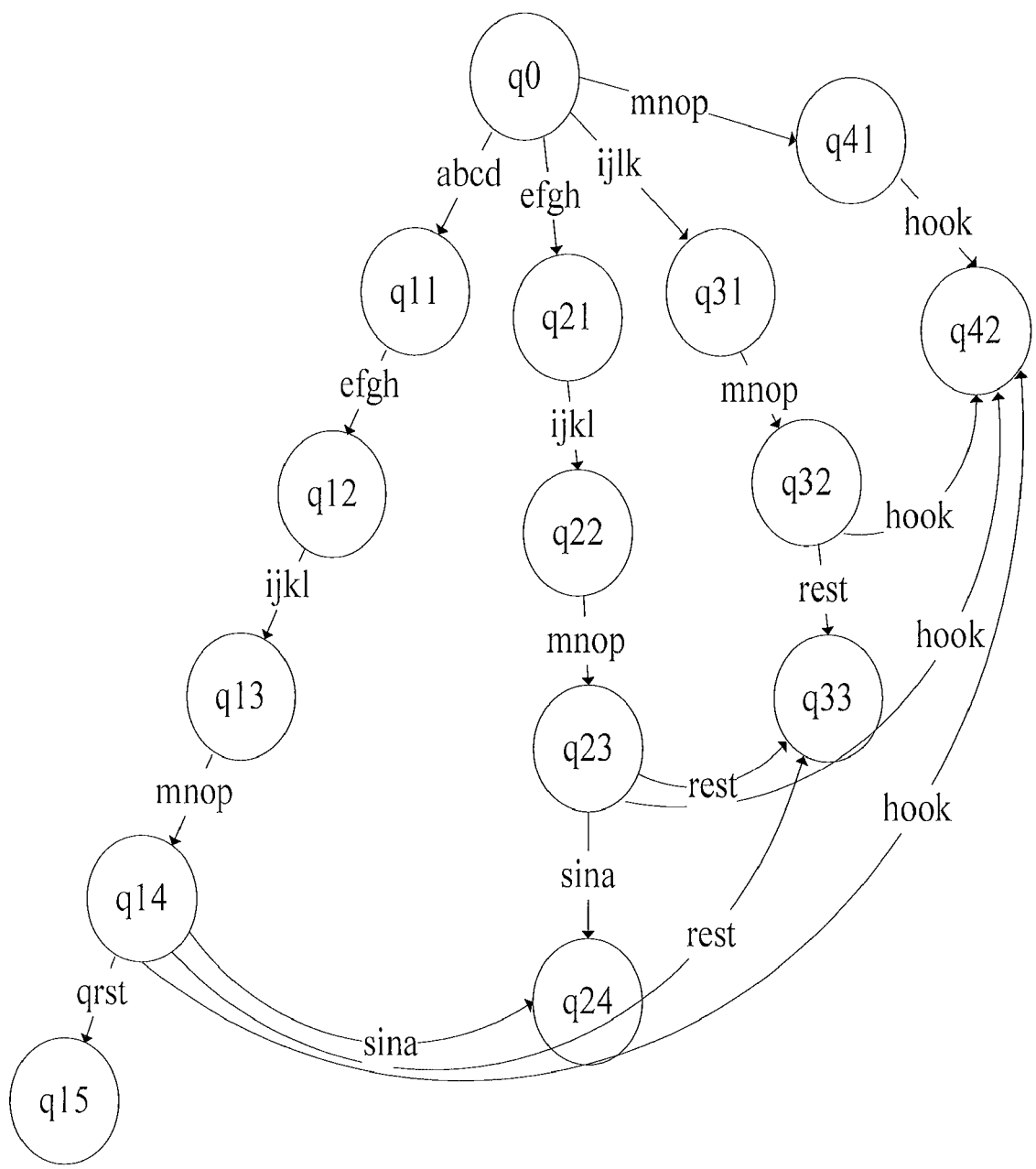
FIG. 9 is a directed schematic diagram of using the technical solution under the present invention to eliminate the failure chain in the first embodiment of the present invention relative to FIG. 7.

In this way, the output entry of the δ function is obtained successfully. FIG. 9 is a directed schematic diagram of eliminating failure chains based on the technical solution under the present invention; and FIG. 10 shows a state transition table of eliminating failure chains based on the technical solution under the present invention.

The detailed steps shown in FIG. 9 and FIG. 10 are: Match a sub-keyword field with patterns according to the δ function when the patterns are identified through the pattern matching state machine created above; if the entry of the δ function indexed by the state node and the sub-keyword field is not available under other than the initial state node q0, set the initial state node q0 to an input state of the δ function of the input state node, and execute the δ function according to the new input state and the sub-keyword field; if the sub-keyword field matches no pattern on the initial state node q0, set q0 to an output state.

In conclusion, with the method for creating a pattern matching state machine in this embodiment, the failure chain in the multi-byte AC algorithm is eliminated, the storage is optimized, the storage resources are saved, and the processing efficiency is improved. The existing failure chain in a multi-byte AC algorithm is eliminated, and the AC algorithm together with the existing goto function is converted into a uniform goto function δ; in the process of converting the failure chain, the entry with a failure transition to the initial state is not generated. Therefore, the storage content does not increase massively, the storage space is saved, the storage structure of the AC algorithm is optimized, the processing steps of the AC algorithm are simplified and solidified, and the processing speed of the AC algorithm is improved.

Embodiment 2

Figure 11:
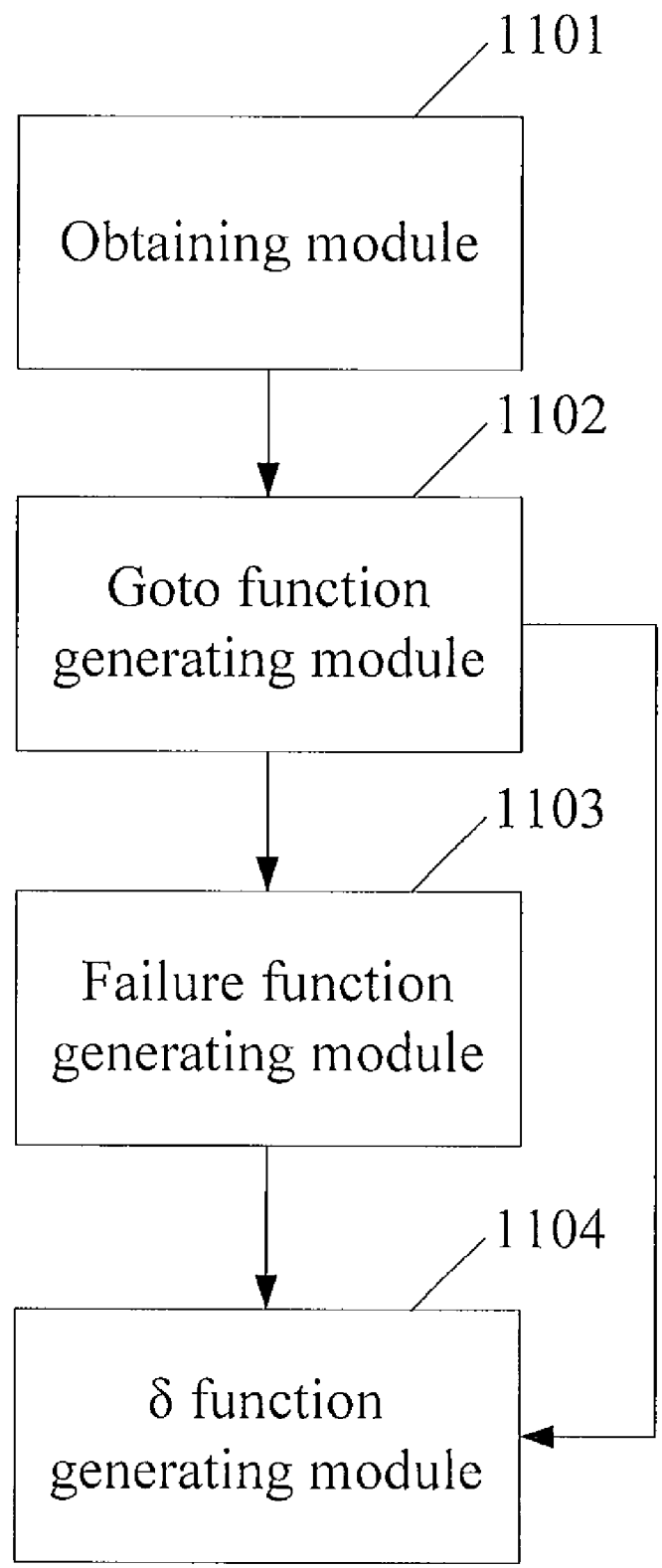
FIG. 11 shows an apparatus for creating a pattern matching state machine provided in a second embodiment of the present invention.

As shown in FIG. 11, an apparatus for creating a pattern matching state machine is provided in this embodiment. The apparatus includes:

an obtaining module 1101, configured to: divide a keyword in a predefined keyword set according to a preset rule, and obtain a sub-keyword field as a result of the division;

a goto function generating module 1102, configured to generate a goto function according to the sub-keyword field obtained by the obtaining module 1101;

a failure function generating module 1103, configured to generate a failure function of each state node according to the goto function generated by the goto function generating module 1102; and a δ function generating module 1104, configured to generate a next-hop goto function δ of each state node according to the goto function generated by the goto function generating module 1102 and the failure function generated by the failure function generating module 1103.

The obtaining module 1101 specifically includes:

a dividing unit, configured to divide a keyword in a predefined keyword set at intervals of preset bytes;

a first obtaining unit, configured to obtain a sub-keyword field according to division performed by the dividing unit;

a second obtaining unit, configured to obtain a sub-keyword field composed of characters shorter than the length of preset bytes if the characters are shorter than the length of the preset bytes when the dividing unit divides the keyword.

The δ function generating module 1104 specifically includes:

a creating unit, configured to: create a state queue S which is null by default; judge whether the output state node of the goto function corresponding to the sub-keyword field exists according to the goto function and the sub-keyword field of an initial state node q0, where the judging begins with initial state node q0; if the output state node exists, set the output state node of the goto function corresponding to the sub-keyword field to be the output state node of the δ function corresponding to the sub-keyword field; and add the output state nodes to the state queue consecutively; and an obtaining unit, configured to: obtain each state node in the state queue consecutively according to a preset rule; after obtaining the state node, delete the obtained state node in the state queue, generate an output of the δ function corresponding to the state node according to the obtained state node and the sub-keyword field, and add the non-null output state nodes to the state queue S consecutively until the state queue is null, where the preset rule may be an FIFO rule of the state nodes in the state queue S.

The obtaining unit specifically includes:

an obtaining and deleting subunit, configured to obtain a state node in the state queue S and delete this state node in the state queue;

a first judging subunit, configured to judge whether the output state node of the goto function corresponding to the sub-keyword field and the state node exists according to the obtained state node and the sub-keyword field;

a first processing subunit, configured to: judge whether the output of the failure function of the state node is the initial state node q0 if the judgment result of the first judging subunit is that no output state node of the goto function corresponding to the sub-keyword field and the state node exists; and terminate the process without creating the δ function entry of the state node if the output is q0; or obtain the output of the δ function according to the output state node and the sub-keyword field of the failure function of the state node if the output is not q0; and a second processing subunit, configured to: if the judgment result of the first judging subunit is that the output state node of the goto function corresponding to the sub-keyword field and the state node exists, set the output state node of the goto function to be the output state node of the δ function of the state node and add the output state node to the state queue.

The apparatus further includes:

a setting module, configured to: set the initial state node q0 to be the output of the δ function of the state node if the entry indexed by the input state node and the input sub-keyword field is not available.

In conclusion, with the apparatus for creating a pattern matching state machine in this embodiment, the failure chain in the multi-byte AC algorithm is eliminated, the storage is optimized, the storage resources are saved, and the processing efficiency is improved. The existing failure chain in a multi-byte AC algorithm is eliminated, and the AC algorithm together with the existing goto function is converted into a uniform goto function δ; in the process of converting the failure chain, the entry with a failure transition to the initial state is not generated. Therefore, the storage content does not increase massively, the storage space is saved, the storage structure of the AC algorithm is optimized, the processing steps of the AC algorithm are simplified and solidified, and the processing speed of the AC algorithm is improved.

Embodiment 3

Figure 12:
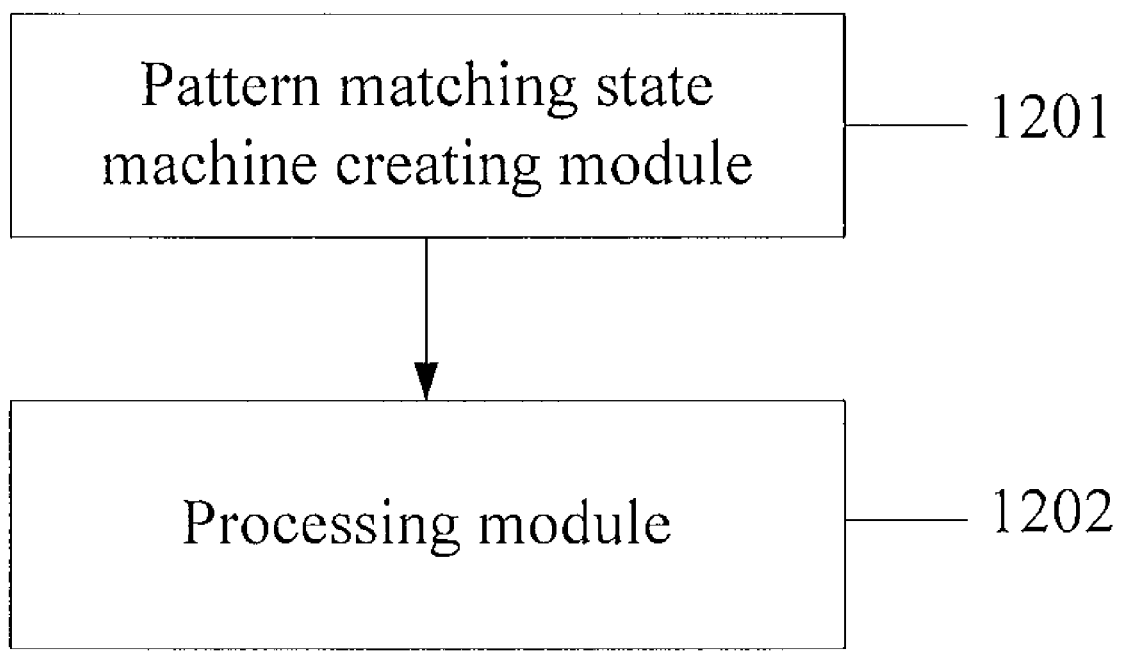
FIG. 12 shows an apparatus for identifying a pattern provided in a third embodiment of the present invention.

As shown in FIG. 12, an apparatus for identifying a pattern is provided in this embodiment. The apparatus includes:

a pattern matching state machine creating module 1201, configured to: divide a keyword in a predefined keyword set according to a preset rule, and obtain a sub-keyword field as a result of the division; generate a goto function according to the sub-keyword field; generate a failure function of each state node according to the goto function; and generate a next-hop goto function δ of each state node according to the goto function and the failure function; and a processing module 1202, configured to: match the sub-keyword field with patterns according to the δ function created by the pattern matching state machine creating module 1201; if an entry of the δ function indexed by the state node and the sub-keyword field is not available under other than an initial state node q0, set the initial state node q0 to an input state of the δ function of the input state node, and execute the δ function according to the new input state and the sub-keyword field; if the sub-keyword field matches no pattern on the initial state node q0, set q0 to an output state.

In conclusion, with the apparatus for identifying a pattern in this embodiment, the failure chain in the multi-byte AC algorithm is eliminated, the storage is optimized, the storage resources are saved, and the processing efficiency is improved. The existing failure chain in a multi-byte AC algorithm is eliminated, and the AC algorithm together with the existing goto function is converted into a uniform goto function δ; in the process of converting the failure chain, the entry with a failure transition to the initial state is not generated. Therefore, the storage content does not increase massively, the storage space is saved, the storage structure of the AC algorithm is optimized, the processing steps of the AC algorithm are simplified and solidified, and the processing speed of the AC algorithm is improved.

The technical solution under the present invention is widely applicable in communications, for example, content charging in a mobile network, and service-based QoS allocation in a fixed network.

Some of the steps involved in the embodiments of the present invention may be implemented by software programs. The software programs may be stored in a readable storage medium such as a hard disk or a Compact Disk-Read Only Memory (CD-ROM).

Although the invention has been described through some exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A method, which is implemented by a hardware processer, for creating a pattern matching state machine, the method comprising:

dividing a keyword in a predefined keyword set according to a preset rule, and obtaining a sub-keyword field as a result of the division;

generating a state transition (goto) function according to the sub-keyword field, and generating a failure function of each state node according to the goto function; and generating a next-hop goto function a δ of each state node according to the goto function and the failure function;

wherein generating the next-hop goto function δ of each state node according to the goto function and the failure function comprises:

obtaining each state node in a state queue S consecutively according to the preset rule; after obtaining each state node, deleting the state node in the state queue S, and generating an output of the next-hop goto function δ corresponding to the state node according to the obtained state node and the sub-keyword field.

2. The method of claim 1, wherein dividing the keyword in the predefined keyword set according to the preset rule and obtaining the sub-keyword field as a result of the division comprises:

dividing the keyword in the predefined keyword set at intervals of preset bytes to obtain the sub-keyword field, wherein at the time of dividing the keyword, characters shorter than the length of the preset bytes constitute one sub-keyword field.

3. The method of claim 1, wherein before obtaining each state node in the state queue S consecutively, the method further comprises:

creating a state queue S, wherein the state queue is null by default;

judging whether an output state node of the goto function corresponding to the sub-keyword field exists according to the goto function and the sub-keyword field of an initial state node q0, wherein the judging begins with q0; if the output state node exists, setting the output state node of the goto function corresponding to the sub-keyword field to be the output state node of the δ function corresponding to the sub-keyword field; and adding non-q0 output state nodes to the state queue S consecutively.

4. The method of claim 1, further comprising:

adding non-null output state nodes to the state queue S consecutively until the state queue is null.

5. The method of claim 1, wherein generating the output of the next-hop goto function δ corresponding to the state node according to the obtained state node and the sub-keyword field comprises:

judging whether an output state node of the goto function corresponding to the sub-keyword field and the state node exists according to the obtained state node and the sub-keyword field;

if the output state node of the goto function does not exist, judging whether an output of the failure function of the state node is an initial state node q0; if then output of the failure function of the state node is the initial state node q0, creating no output entry of the δ function of the state node; if not, obtaining the output of the δ function of the state node according to the output state node and the sub-keyword field of the failure function of the state node; and if the output state node of the goto function exists, setting the output state node of the goto function as the output of the δ function of the state node, and adding the output state node of the δ function to the state queue.

6. The method of claim 5, wherein obtaining the output of the δ function of the state node according to the output state node and the sub-keyword field of the failure function of the output state node comprises:

using the output state node and the sub-keyword field of the failure function of the state node as an input of the δ function, and generating the output of the δ function of the output state node of the failure function; if the output of the δ function does not exist, creating no output entry of the δ function of the state node.

7. The method of claim 1, wherein:
the preset rule is a First In First Out (FIFO) rule of state nodes in the state queue S.

8. The method of claim 1, further comprising:
matching the sub-keyword field with patterns according to the δ function; if an entry of the δ function indexed by the state node and the sub-keyword field is not available under other than an initial state node q0, setting the initial state node q0 to an input state of the δ function of an input state node, and executing the δ function according to the set input state and the sub-keyword field; if the sub-keyword field matches no pattern on the initial state node q0, setting the q0 to an output state.

9. An apparatus, which is implemented by a hardware processor, for creating a pattern matching state machine, the apparatus comprising:
an obtaining module, configured to: divide a keyword in a predefined keyword set according to a preset rule, and obtain a sub-keyword field as a result of the division;
a goto function generating module, configured to generate a goto function according to the sub-keyword field obtained by the obtaining module;
a failure function generating module, configured to generate a failure function of each state node according to the goto function generated by the goto function generating module; and
a δ function generating module, configured to generate a next-hop goto function δ of each state node according to the goto function generated by the goto function generating module and the failure function generated by the failure function generating module;
wherein the δ function generating module comprises:
an obtaining unit, configured to: obtain each state node in a state queue consecutively according to the preset rule; after obtaining the state node, delete the obtained state node in the state queue, generate an output of the δ function corresponding to the state node according to the obtained state node and the sub-keyword field, and add non-null output state nodes to the state queue S consecutively until the state queue is null.

10. The apparatus of claim 9, wherein the obtaining module comprises:
a dividing unit, configured to divide the keyword in the predefined keyword set at intervals of preset bytes;
a first obtaining unit, configured to obtain the sub-keyword field according to the division performed by the dividing unit; and
a second obtaining unit, configured to obtain a sub-keyword field composed of characters shorter than the length of the preset bytes if the characters are shorter than the length of the preset bytes when the dividing unit divides the keyword.

11. The apparatus of claim 9, wherein the δ function generating module further comprises:
a creating unit, configured to: create a state queue S which is null by default; judge whether an output state node of the goto function corresponding to the sub-keyword field exists according to the goto function and the sub-keyword field of an initial state node q0, wherein the judging begins with the initial state node q0; if the output state node exists, set the output state node of the goto function corresponding to the sub-keyword field to be the output state node of the δ function corresponding to the sub-keyword field; and add non-q0 output state nodes to the state queue consecutively.

12. The apparatus of claim 9, wherein the obtaining unit comprises:
an obtaining and deleting subunit, configured to obtain a state node in the state queue S and delete the obtained state node in the state queue;
a first judging subunit, configured to judge whether an output state node of the goto function corresponding to the sub-keyword field and the state node exists according to the obtained state node and the sub-keyword field;
a first processing subunit, configured to: judge whether an output of the failure function of the state node is an initial state node q0 if a judgment result of the first judging subunit is that no output state node of the goto function corresponding to the sub-keyword field and the state node exists; terminate the process without creating a δ function entry of the state node if the output is q0; or obtain the output of the δ function according to the output state node and the sub-keyword field of the failure function of the state node if the output is not q0; and
a second processing subunit, configured to: if the judgment result of the first judging subunit is that an output state node of the goto function corresponding to the sub-keyword field and the state node exists, set the output state node of the goto function to be the output state node of the δ function of the state node and add the output state node to the state queue.

13. The apparatus of claim 9, further comprising:
a setting module, configured to set an initial state node q0 to be an output of the δ function of the state node if an entry indexed by an input state node and an input sub-keyword field is not available.

14. The apparatus of claim 9, further comprising:
a processing module, configured to: match the sub-keyword field with patterns according to the δ function created by the pattern matching state machine creating module; if an entry of the δ function indexed by the state node and the sub-keyword field is not available under other than an initial state node q0, set the initial state node q0 to an input state of the δ function of an input state node, and execute the δ function according to the set input state and the sub-keyword field; if the sub-keyword field matches no pattern on the initial state node q0, set q0 to an output state.

15. A non-transitory computer-readable storage medium for storing a program for causing a processor to perform a process, comprising:
dividing a keyword in a predefined keyword set according to a preset rule, and obtaining a sub-keyword field as a result of the division;
generating a state transition (goto) function according to the sub-keyword field, and generating a failure function of each state node according to the goto function; and
generating a next-hop goto function δ of each state node according to the goto function and the failure function;
wherein generating the next-hop goto function δ of each state node according to the goto function and the failure function comprises:
obtaining each state node in a state queue S consecutively according to the preset rule; after obtaining each state node, deleting the state node in the state queue S, and generating an output of the next-hop goto function δ corresponding to the state node according to the obtained state node and the sub-keyword field.

16. The computer-readable storage medium of claim 15, wherein dividing the keyword in the predefined keyword set according to the preset rule and obtaining the sub-keyword field as a result of the division comprises:

dividing the keyword in the predefined keyword set at intervals of preset bytes to obtain the sub-keyword field, wherein at the time of dividing the keyword, characters shorter than the length of the preset bytes constitute one sub-keyword field.

17. The computer-readable storage medium of claim 15, wherein before obtaining each state node in the state queue S consecutively, the processor further performing:

creating a state queue S, wherein the state queue is null by default;

judging whether an output state node of the goto function corresponding to the sub-keyword field exists according to the goto function and the sub-keyword field of an initial state node q0, wherein the judging begins with q0; if the output state node exists, setting the output state node of the goto function corresponding to the sub-keyword field to be the output state node of the δ function corresponding to the sub-keyword field; and adding non-q0 output state nodes to the state queue S consecutively.

18. The computer-readable storage medium of claim 15, the process further comprising:

adding non-null output state nodes to the state queue S consecutively until the state queue is null.

19. The computer-readable storage medium of claim 15 wherein generating the output of the next-hop goto function δ corresponding to the state node according to the obtained state node and the sub-keyword field comprises:

judging whether an output state node of the goto function corresponding to the sub-keyword field and the state node exists according to the obtained state node and the sub-keyword field;

if the output state node of the goto function does not exist, judging whether an output of the failure function of the state node is an initial state node q0; if then output of the failure function of the state node is the initial state node q0, creating no output entry of the δ function of the state node; if not, obtaining the output of the δ function of the state node according to the output state node and the sub-keyword field of the failure function of the state node; and if the output state node of the goto function exists, setting the output state node of the goto function as the output of the δ function of the state node, and adding the output state node of the δ function to the state queue.

20. The computer-readable storage medium of claim 19, wherein obtaining the output of the δ function of the state node according to the output state node and the sub-keyword field of the failure function of the output state node comprises:

using the output state node and the sub-keyword field of the failure function of the state node as an input of the δ function, and generating the output of the δ function of the output state node of the failure function; if the output of the δ function does not exist, creating no output entry of the δ function of the state node.

* * * * *